United States Patent [19]

Lee

[11] Patent Number: 5,754,253
[45] Date of Patent: May 19, 1998

[54] APPARATUS FOR GENERATING A PLURALITY OF QUASI-MOVING PIP/POP SCREENS

[75] Inventor: Jun Yung Lee, Kyungsangbook-Do, Rep. of Korea

[73] Assignee: LG Electronics Inc., Rep. of Korea

[21] Appl. No.: 895,162

[22] Filed: Jul. 16, 1997

Related U.S. Application Data

[63] Continuation of Ser. No. 584,843, Jan. 11, 1996, abandoned.

[51] Int. Cl.$^6$ .................................................. H04N 5/50
[52] U.S. Cl. ..................... 348/565; 348/567; 348/588; 348/731
[58] Field of Search ............................. 348/565, 567, 348/588, 731, 563, 564; 315/371, 370; 455/290, 132, 139; H04N 5/50

[56] References Cited

U.S. PATENT DOCUMENTS

| | | | |
|---|---|---|---|
| 4,249,213 | 2/1981 | Imaide et al. ............................. | 358/183 |
| 5,420,642 | 5/1995 | Baek ........................................ | 348/565 |
| 5,434,626 | 7/1995 | Hayashi et al. .......................... | 348/569 |

*Primary Examiner*—Glenton B. Burgess
*Attorney, Agent, or Firm*—Ostrolenk, Faber, Gerb & Soffen, LLP

[57] ABSTRACT

An apparatus for generating a plurality of picture-in-picture/picture-out-picture (PIP/POP) screens, capable of achieving a fast tuning for a plurality of channels. In accordance with the invention, automatic gain control data associated with each channel is stored in a tuning memory upon an initialization thereof. Video data stored in a buffer video memory is displayed and stored in a main video memory. Write and read operations of these video memory are controlled in a handshake fashion using a flag. Upon a channel change, previously stored automatic gain control data and tuning frequency are used, thereby achieving a fast tuning. The apparatus of the invention can provide fast quasi-moving PIP/POP screens.

6 Claims, 10 Drawing Sheets

FIG. 1A
CONVENTIONAL ART
| A | B | C | D |
|---|---|---|---|
| E | F | G | H |
| I | J | K | L |
FIG. 1B
CONVENTIONAL ART
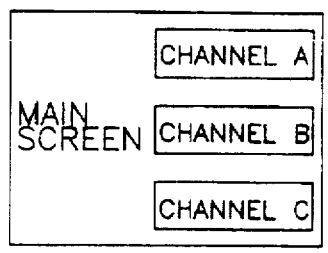
FIG. 1C
CONVENTIONAL ART
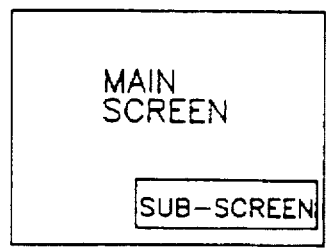

APPARATUS FOR GENERATING A PLURALITY OF QUASI-MOVING PIP/POP SCREENS

This is a continuation of application Ser. No. 08/584,843 filed on Jan. 11, 1996, now abandoned.

BACKGROUND OF THE INVENTION

1. Field of the Invention

The present invention relates to techniques of generating a plurality of picture-in-picture/picture-out-picture (PIP/POP) screens, and more particularly to an apparatus for generating quasi-moving PIP/POP screens, capable of providing at least three quasi-moving PIP/POP screens using two tuners or providing a plurality of screens, in the form of quasi-moving PIP/POP, larger in number than the number of tuners used while selecting external video signals received from the outside by use of a time division system.

2. Description of the Prior Art

Generally, PIP/POP display systems for providing at least one sub-screen in addition to a main screen includes the system, wherein a screen is divided into a plurality of screens A to L, as shown in FIG. 1A, the system, wherein three sub-screens are included in a main screen, as shown in FIG. 1B, and the system, wherein one sub-screen is included in a main screen, as shown in FIG. 1C.

Referring to FIG. 2, a conventional apparatus for generating quasi-moving PIP/POP screens is illustrated. As shown in FIG. 2, the apparatus includes a microcomputer 12 for outputting a switching control signal SC1 in accordance with a channel search signal received from a remote controller 10, and a sub-screen tuner 14 for tuning radio frequency video signals under the control of the microcomputer 12. Between the sub-screen tuner 14 and microcomputer 12, a sub-screen intermediate frequency detector 16 is coupled, which serves to detect an intermediate frequency signal output from the sub-screen tuner 14 and applies an automatic fine tuning signal AFT1 generated as a result of its detection to the microcomputer 12. The sub-screen intermediate frequency detector 16 also outputs a sub-screen video signal. The apparatus also includes a main screen tuner 18 for tuning radio frequency video signals under the control of the microcomputer 12, and a main screen intermediate frequency detector 20 coupled between the main-screen tuner 18 and microcomputer 12. The main screen intermediate frequency detector 20 detects an intermediate frequency signal output from the main screen tuner 18 and applies an automatic fine tuning signal AFT2 generated as a result of its detection to the microcomputer 12. The main screen intermediate frequency detector 20 also outputs a main screen video signal. A video switching unit 22 is also provided which selects one of the sub-screen video signal output from the sub-screen intermediate frequency detector 16, the main screen video signal output from the main screen intermediate frequency detector 20 and a plurality of external video signals AV1 to AVn received from the outside, in accordance with the switching control signal SC1 output from the microcomputer 12. The apparatus further includes a pair of horizontal/vertical synchronous pulse signal generators 24 and 32, and a PIP screen generator 28. The horizontal/vertical synchronous pulse signal generator 24 is adapted to apply horizontal/vertical synchronous pulse signals H/V1 for the sub-screen video signal to the microcomputer 12 when the video switching unit 22 outputs the sub-screen video signal. On the other hand, the horizontal/vertical synchronous pulse signal generator 32 is adapted to apply horizontal/vertical synchronous pulse signals H/V2 for the main screen video signal to the microcomputer 12 when the video switching unit 22 outputs the main screen video signal. In accordance with the horizontal/vertical synchronous pulse signals H/V1 and H/V2 respectively output from the horizontal/vertical synchronous pulse signal generators 24 and 32, the PIP screen generator 28 appropriately reduces the sub-screen video signal output from the video switching unit 22, thereby generating a PIP screen video signal. The apparatus further includes a memory 26 for storing the PIP screen video signal generated from the PIP screen generator 28, a video processing and PIP screen switching unit 30 for switching the PIP screen video signal output from the PIP screen generator 28 and the main screen video signal selected by the video switching unit 22, and a two-dimensional display unit 34 for displaying the video signal selected by the video processing and PIP screen switching unit 30.

Where the apparatus uses an automatic gain control voltage to stably control the tuning operation of the sub-screen tuner 14, it may also include a low-pass filter 13, as shown in FIG. 3.

The operation of the quasi-moving PIP/POP screen generating apparatus having the above arrangement will now be described.

When a user selects a desired channel using the remote controller 10, a channel search signal from the remote controller 10 is applied to the microcomputer 12. Based on the channel search signal, the microcomputer 12 outputs a switching control signal SC1 for controlling the video switching unit 22 to select a desired video signal from either a main screen video signal output from the main screen intermediate frequency detector 20 or one from a plurality of external video signals AV1 to AVn. The microcomputer 12 also applies, to the main screen tuner 18, a tuning voltage accurately compensated on the basis of an automatic fine tuning signal AFT2 received from the main screen intermediate frequency detector 20 and horizontal/vertical synchronous pulse signals H/V2 received from the horizontal/vertical synchronous pulse signal generator 32. The video signal selected by the video switching unit 22, which is the main screen video signal or one of the external video signals AV1 to AVn, is displayed on a main screen shown in FIG. 1B by the two-dimensional display unit 34.

When another channel search signal is applied to the microcomputer 12 by a user's manipulation while successive pictures are being continuously displayed on the main screen in the form of moving pictures, the microcomputer 12 outputs another switching control signal SC1 for selecting a sub-screen video signal output from the sub-screen intermediate frequency detector 16. The microcomputer 12 also slowly increases the tuning voltage until the sub-screen tuner 14 receives a first radio frequency video signal. The tuning voltage, which is applied to the sub-screen tuner 14, is compensated in the same fashion as for the main screen tuner 18.

The first radio frequency video signal is then reduced to an appropriate size by the PIP screen generator 28 so that it can be displayed on a sub-screen. The size-reduced first radio frequency video signal is then stored in the memory 26. Thereafter, the memory 26 sends the stored video signal to the two-dimensional display unit 34 via the video processing and PIP screen switching unit 30. Accordingly, the two-dimensional display unit 34 displays the video signal on a sub-screen for the channel A shown in FIG. 1B.

As the microcomputer 12 continuously increases the tuning voltage until the subscreen tuner 14 subsequently receives a second radio frequency video signal. Accordingly, the second radio frequency video signal is displayed on a sub-screen for the channel B shown in FIG. 1B by the two-dimensional display unit 34 in accordance with the procedure as mentioned above. As the tuning voltage further increases, a third video signal is then displayed on a sub-screen for the channel C shown in FIG. 1B by the two-dimensional display unit 34.

Thus, the channel search is performed in the order of Channel A→Channel B→Channel C→Channel A until all predetermined frequency bands are completely searched.

The PIP display scheme shown in FIG. 1C is the scheme wherein a moving picture for a main screen and a quasi-moving picture for a sub-screen are simultaneously received and displayed using two tuners.

In this case, the microcomputer 12 supplies a main screen tuning voltage to the main screen tuner 18 which, in turn, generates an intermediate frequency signal. This intermediate frequency signal is converted into a composite video signal with a baseband for the main screen by the main screen intermediate frequency detector 20 and then sent to the video switching unit 22. In accordance with a switching control signal SC1 output from the microcomputer 12, the video switching unit 22 selects the composite video signal converted to be of the main screen baseband or one of external video signals AV1 to AVn. The video signal selected by the video switching unit 22 is then displayed on the main screen shown in FIG. 1C by the two-dimensional display unit 34 after passing through the video processing and PIP screen switching unit 30.

A composite video signal with a baseband for the sub-screen is also generated through the sub-screen tuner 14 and sub-screen intermediate frequency detector 16 in accordance with the tuning voltage output from the microcomputer 12. In this case, the video switching unit 22 selects the composite video signal of the sub-screen baseband or one of external video signals AV1 to AVn. The selected video signal is then displayed on the sub-screen shown in FIG. 1C by the two-dimensional display unit 34 after passing through the video processing and PIP screen switching unit 30.

As mentioned above, an automatic gain control voltage may be used to stably control the tuning operation of the sub-screen tuner 14, as shown in FIG. 3. In this case, the sub-screen intermediate frequency detector 16 generates an automatic gain control voltage AGC which is, in turn, applied to the sub-screen tuner 14 after passing through the low-pass filter 13. In FIG. 4, automatic gain control voltages for tuning video signals for different channels A, B and C are denoted by "VA", "VB" and "XC", respectively. In FIG. 4, a variation in gain depending on the field strength is also shown. Curves C1, C2 and C3 depicted in FIG. 4 indicate a variation in the gain of the sub-screen tuner 14, a variation in the gain of the sub-screen intermediate frequency detector 16, and a variation in the total gain, respectively.

However, general PIP display means can not simultaneously provide at least three quasi-moving screens using two tuners. Although such a problem may be solved by the addition of another tuner, this results in an increase in the manufacturing cost. In the case of using the automatic gain control voltage, there is a problem in that the screen may flicker. Since the low-pass filter used in this case comprises a resistor and a capacitor which require a large time constant, the waveform WI of the automatic gain control voltage output from the low-pass filter involve a fall time ft and a rise time rt. For example, where the low-pass filter comprises a resistor with a resistance of about 10 KΩ and a capacitor with a capacitance of about 50 μF, the fall time ft and rise time rt are 0.5 seconds, respectively, because the time constant is 0.5 seconds. Accordingly, a time of at least 0.5 seconds is taken to stabilize the sub-screen video signal upon changing the channel. As a result, there is a screen flickering phenomenon. In this case, it is impossible to provide three PIP/POP screens within one second. Consequently, each PIP/POP screen generated using the automatic gain control voltage is not different from the still screen because its generation is very slow.

SUMMARY OF THE INVENTION

Therefore, an object of the invention is to provide an apparatus for generating quasi-moving PIP/POP screens, capable of providing at least three quasi-moving PIP/POP screens using two tuners or providing a plurality of screens, in the form of quasi-moving PIP/POP, larger in number than the number of tuners used while selecting external video signals received from the outside by use of a time division system.

In accordance with the present invention, this object is accomplished by providing an apparatus for generating a plurality of quasi-moving PIP/POP screens, comprising: a tuning memory for storing tuning data used to tune radio frequency video signals of various channels; a microcomputer for controlling a tuning operation for each of the radio frequency video signals in accordance with each associated channel search signal received through a remote controller; a main screen tuning unit for tuning a radio frequency video signal of a channel associated with a main screen under a control of the microcomputer, thereby outputting a main screen video signals; a sub-screen tuning unit for sequentially tuning radio frequency video signals of a plurality of channels respectively associated with sub-screens, thereby outputting sub-screen video signals; a video switching and horizontal/vertical synchronous pulse signal generating unit for selecting either one of the video signals output from the sub-screen and main screen tuning units or an externally input video signal and detecting horizontal/vertical synchronous pulse signals for the main screen and sub-screen video signals; a quasi-moving PIP/POP screen generating unit for controlling the video signal selection of the video switching and horizontal/vertical synchronous pulse signal generating unit, reducing the selected video signal, and outputting a quasi-moving PIP/POP video signal and a fast blanking signal; a video memory unit for storing the reduced video signal output from the quasi-moving PIP/POP screen generating unit, the video memory unit including a buffer video memory and a main video memory; and a video processing and display unit for displaying the quasi-moving PIP/POP video signal output from the quasi-moving PIP/POP screen generating unit and the main screen video signal output from the video switching and horizontal/vertical synchronous pulse signal generating unit.

BRIEF DESCRIPTION OF THE DRAWINGS

Other objects and aspects of the invention will become apparent from the following description of embodiments with reference to the accompanying drawings in which:

FIGS. 1A to 1C are schematic views respectively illustrating conventional PIP screens, wherein FIG. 1A shows the case wherein a screen is divided into a plurality of screens, FIG. 1B shows the case wherein a main screen is provided with three sub-screens, and FIG. 1C shows the case wherein a main screen is provided with one sub-screen;

FIGS. 5A and 5B are schematic views respectively illustrating quasi-moving PIP/POP screens in accordance with the present invention, wherein FIG. 5A shows quasi-moving PIP/POP screens when a vertical synchronous pulse signal for the main screen is used, and FIG. 5B shows quasi-moving PIP/POP screens when a horizontal synchronous pulse signal for the main screen is used;

DETAILED DESCRIPTION OF THE PREFERRED EMBODIMENTS

Figure 6:
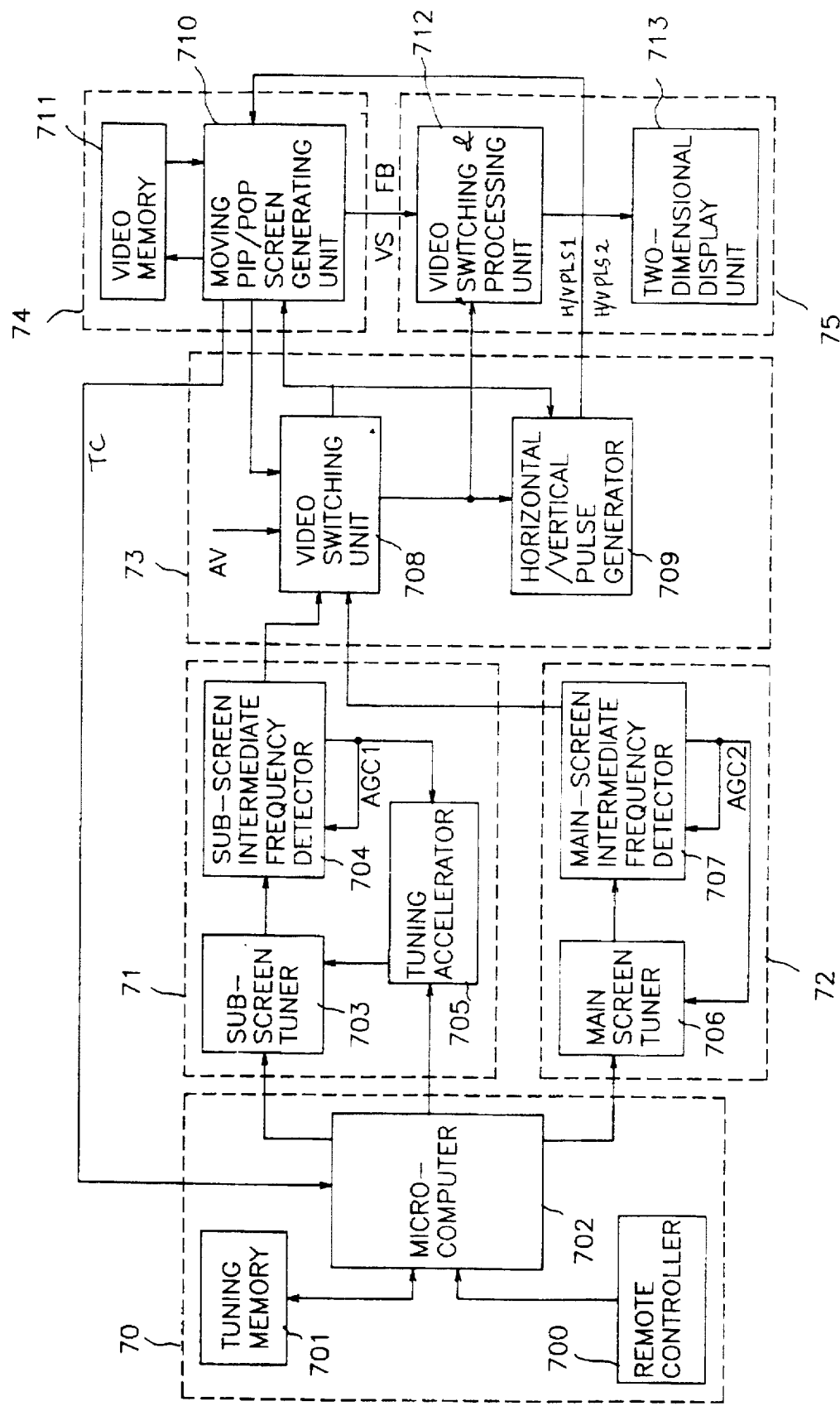
FIG. 6 is a block diagram illustrating an apparatus for generating a plurality of quasi-moving PIP/POP screens in accordance with the present invention.

FIG. 6 illustrates an apparatus for generating a plurality of quasi-moving PIP/POP screens in accordance with the present invention.

As shown in FIG. 6, the apparatus of the present invention includes a control unit 70 for controlling a tuning operation for receiving respective radio frequency video signals for a main screen and at least one sub-screen using previously stored tuning data about various broadcast channels, a sub-screen tuning unit 71 for tuning the radio frequency video signal for the sub-screen under the control of the control unit 70, and a main screen tuning unit 72 for tuning the radio frequency video signal for the main screen under the control of the control unit 70. A video switching and horizontal/vertical synchronous pulse signal generating unit 73 is also provided which serves to select either one of the video signals output from the sub-screen tuning unit 71 and main screen tuning unit 72 or a video signal AV under the control of the control unit 70. The video switching and horizontal/vertical synchronous pulse signal generating unit 73 also outputs horizontal/vertical synchronous pulse signals H/Vpls1 for the main screen and horizontal/vertical synchronous pulse signals H/Vpls2 for the sub-screen. The apparatus further includes a PIP/POP screen generating unit 74 for receiving the video signal and horizontal/vertical synchronous pulse signals H/Vpls1 and H/Vpls2 output from the video switching and horizontal/vertical synchronous pulse signal generating unit 73, storing reduced digital video data, and outputting a quasi-moving PIP/POP video signal VS and a fast blanking signal FB, and a video processing and display unit 75 for selecting either the quasi-moving PIP/POP video signal VS output from the PIP/POP screen generating unit 74 or the video signal output from the video switching and horizontal/vertical synchronous pulse signal generating unit 73, and displaying the selected video signal after appropriately processing it for its display.

The control unit 70 includes a remote controller 700 for providing an interface for the user, a tuning memory 701, such as EEPROM, for storing tuning data about each broadcast channel, and a microcomputer 702 for controlling the sub-screen tuning unit 71 and main screen tuning unit 72 by use of the tuning data stored in the tuning memory 701 in accordance with a channel search signal received from the remote controller 700.

Figure 7:
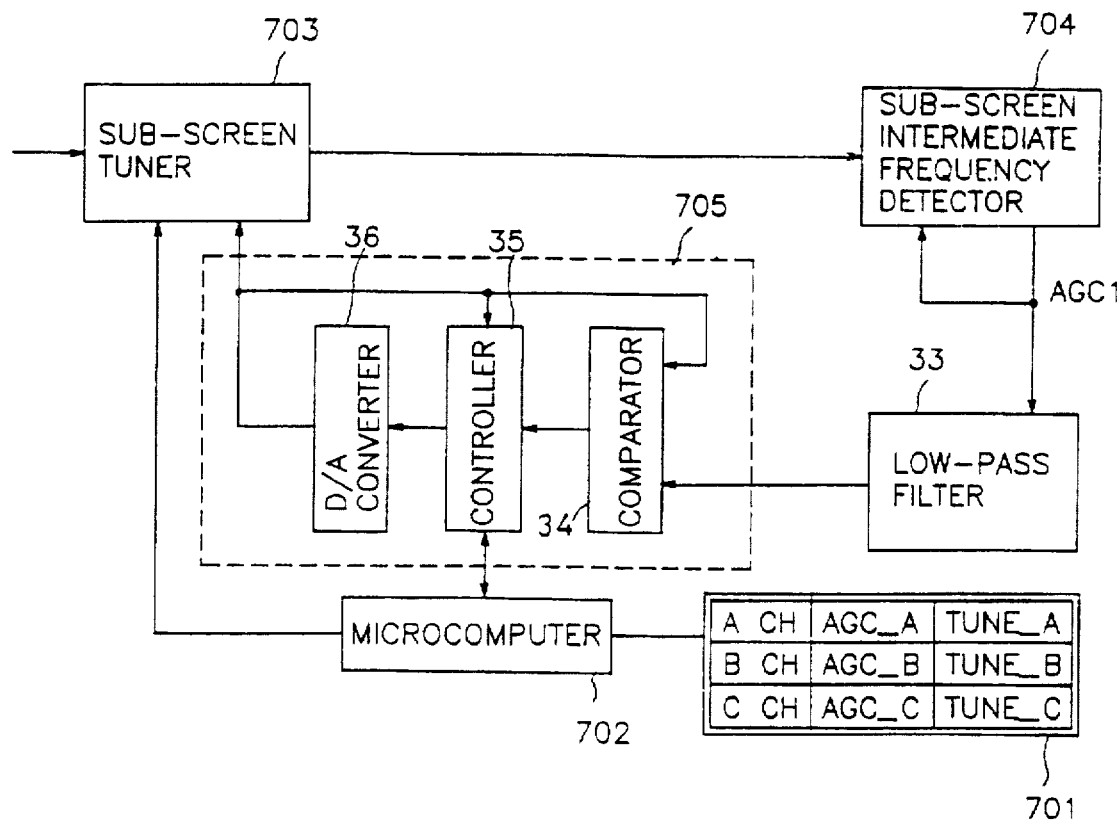
FIG. 7 is a block diagram illustrating a sub-screen tuning unit included in the apparatus of FIG. 6.

As shown in FIG. 7, the sub-screen tuning unit 71 includes a sub-screen tuner 703 for tuning the sub-screen radio frequency video signal received to the sub-screen tuning unit 71 under the control of the microcomputer 702, a sub-screen intermediate frequency detector 704 for detecting an intermediate frequency signal output from the sub-screen tuner 703, thereby outputting a sub-screen video signal, and a tuning accelerator 705 for increasing or decreasing an automatic gain control voltage AGC1 received from the subscreen intermediate frequency detector 704 via a low-pass filter 33 and applying the increased or decreased automatic gain control voltage to the sub-screen tuner 703.

The tuning accelerator 705 includes a comparator 34 for comparing the automatic gain control voltage received through the low-pass filter 33 with a fed-back automatic gain control voltage, a controller 35 for converting the fed-back automatic gain control voltage into digital automatic gain control data, increasing or decreasing the automatic gain control data in accordance with an output signal from the comparator 34, and controlling the tuning memory 701 to store, the increased or decreased automatic gain control data therein, and a digital/analog converter 36 for converting the automatic gain control data output from the controller 35 into an analog automatic gain control voltage.

On the other hand, the main screen tuning unit 72 includes a main screen tuner 706 for tuning the main screen radio frequency video signal received to the main screen tuning unit 72 under the control of the microcomputer 702, and a main screen intermediate frequency detector 707 for detecting an intermediate frequency signal output from the main screen tuner 706, thereby outputting a main screen video signal.

The video switching and horizontal/vertical synchronous pulse signal generating unit 73 includes a video switching unit 708 for selecting either one of the video signals output from the sub-screen tuning unit 71 and main screen tuning unit 72 or the externally input video signal AV under the control of the PIP/POP screen generating unit 74, and a horizontal/vertical synchronous pulse signal generator 709 for generating the horizontal/vertical synchronous pulse signals H/Vpls1 for the main screen or the horizontal/vertical synchronous pulse signals H/Vpls2 for the sub-screen in accordance with the video signal selected by the video switching unit 708.

The PIP/POP screen generating unit 74 includes a quasi-moving PIP/POP screen generating unit 710 for reducing either the sub-screen video signal or externally input video signal AV received through the video switching unit 708, and outputting the quasi-moving PIP/POP video signal VS and fast blanking signal FB as well as a tuning control signal Tc. The PIP/POP screen generating unit 74 also includes a video memory unit 711 for storing the reduced sub-screen video signal under the control of the quasi-moving PIP/POP screen generating unit 710. The video memory unit 711 includes a buffer video memory 808 and a main video memory 809 having memory locations for channels A, B and C.

Figure 8:
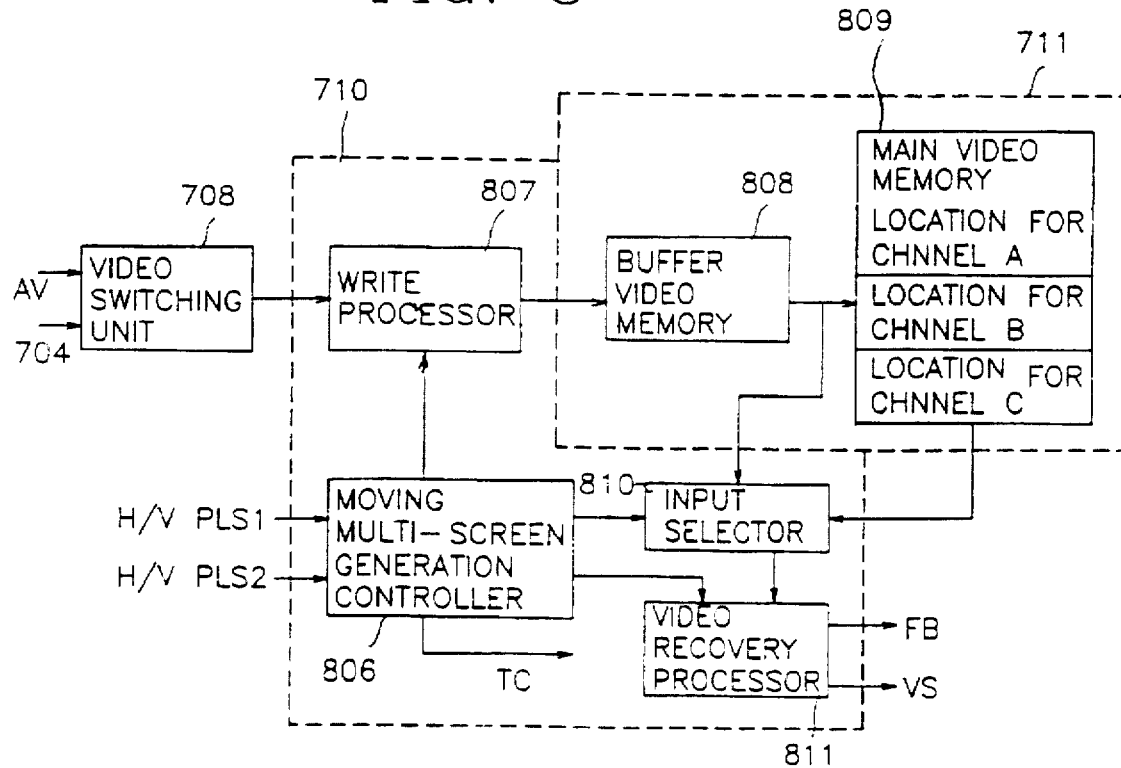
FIG. 8 is a block diagram illustrating a PIP/POP screen generating unit included in the apparatus of FIG. 6.

As shown in FIG. 8, the quasi-moving PIP/POP screen generating unit 710 includes a quasi-moving multi-screen generation controller 806 for receiving the horizontal/ vertical synchronous pulse signals H/Vpls1 for the main screen and the horizontal/vertical synchronous pulse signals H/Vpls2 for the sub-screen, thereby outputting the tuning control signal Tc while controlling the video switching unit 708. The quasi-moving PIP/POP screen generating unit 710 further includes a write processor 807 for reducing the sub-screen video signal received through the video switching unit 708 in vertical and horizontal directions under the control of the quasi-moving multi-screen generation controller 806 and recording the reduced digital video data in the video memory unit 711, an input selector 810 for selecting video data output from the video memory unit 711 under the control of the quasi-moving multi-screen generation controller 806, and a video recovery processor 811 for recovering the sub-screen video signal from the video data output from the input selector 810 under the control of the quasi-moving multi-screen generation controller 806, thereby outputting the quasi-moving PIP/POP video signal VS and the fast blanking signal FB.

The video processing and display unit 75 includes a video switching and processing unit 712 for selecting the main screen video signal received through the video switching unit 708 or the quasi-moving PIP/POP video signal VS output from the video recovery processor 811 and appropriately processing the selected video signal for its display, and a two-dimensional display unit 713 for receiving the fast blanking signal FB and displaying the video signal output from the video switching and processing unit 712.

The operation of the apparatus having the above-mentioned arrangement according to the present invention will now be described.

Figure 2:
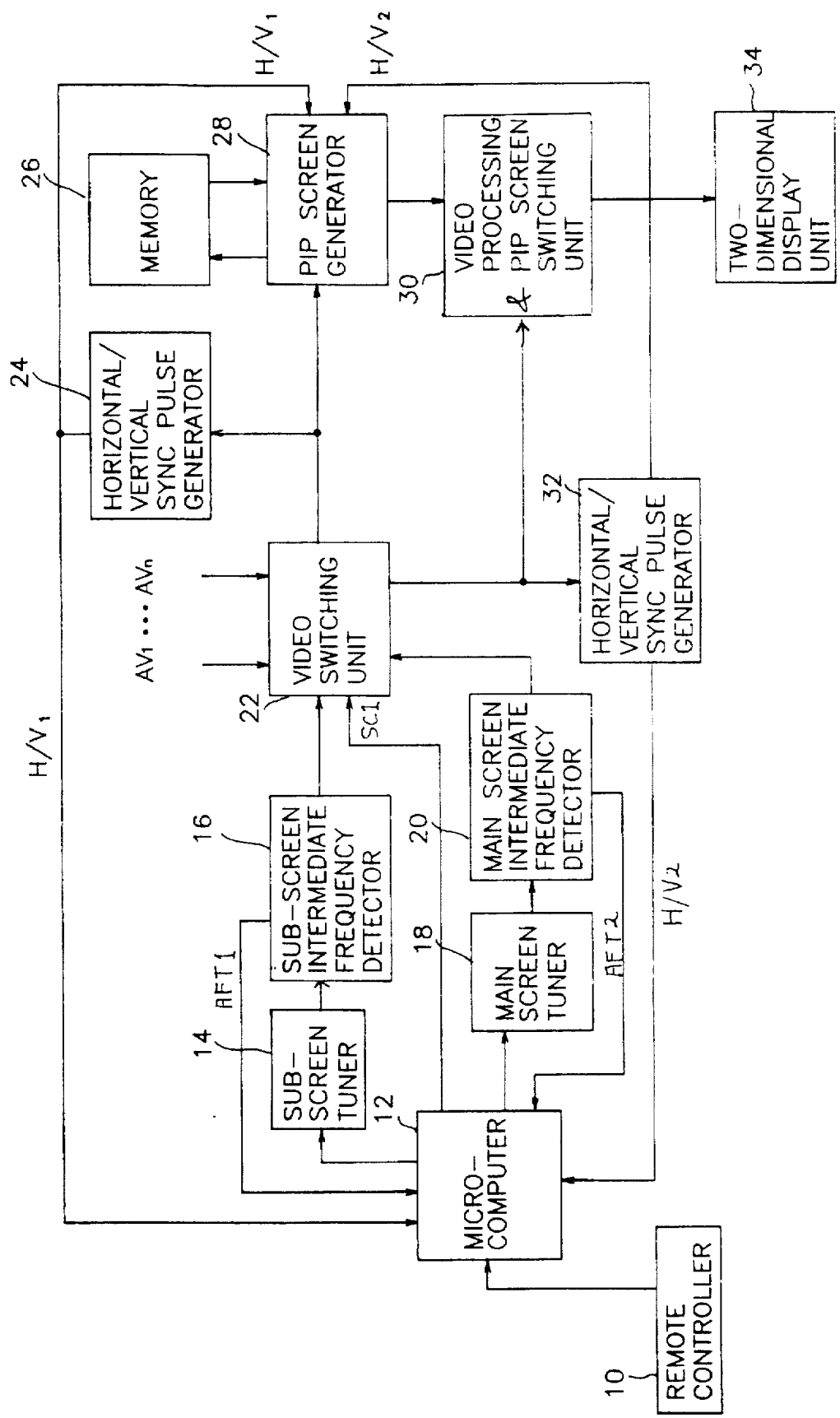
FIG. 2 is a block diagram illustrating a conventional apparatus for generating quasi-moving PIP/POP screens.
Figure 3:
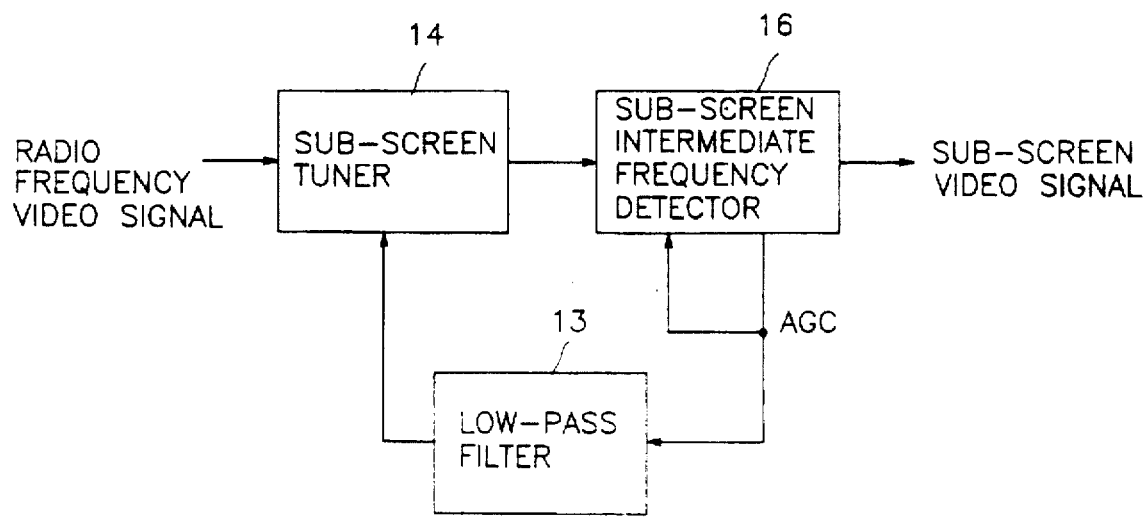
FIG. 3 is a block diagram illustrating a conventional automatic gain control voltage processing unit equipped in the apparatus of FIG. 2 where an automatic gain control voltage is used.
Figure 4:
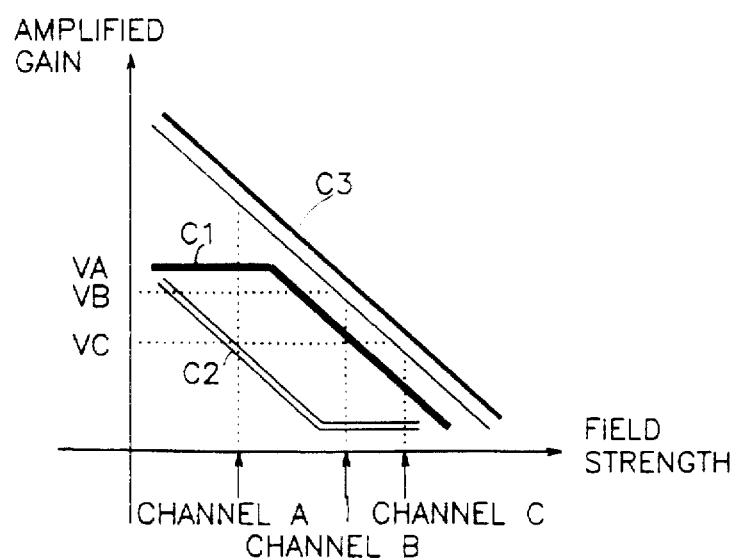
FIG. 4 is a characteristic curve diagram illustrating an amplified gain obtained by the automatic gain control voltage of FIG. 3 for each channel.
Figure 5A:
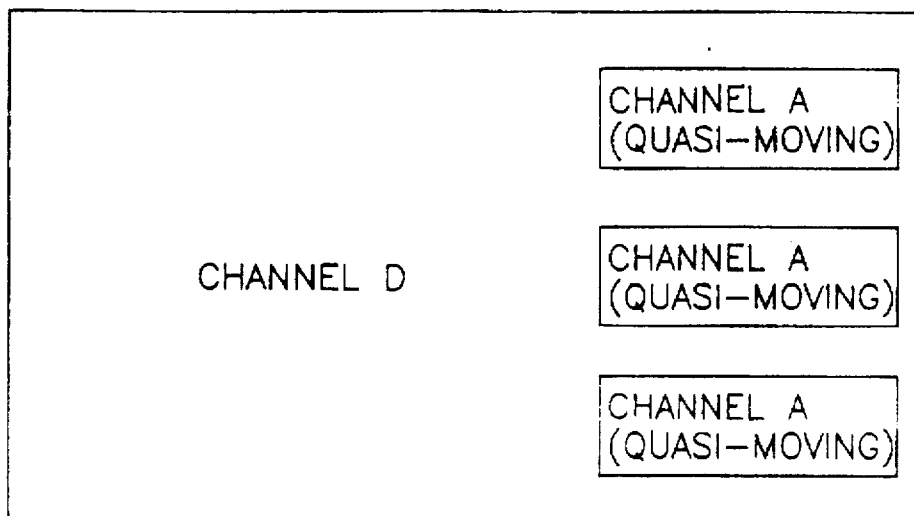

When a channel search signal is applied from the remote controller 700 to the microcomputer 702, the main screen tuner 706 selects, from input radio frequency video signals, a desired radio frequency video signal associated with a target broadcast channel, for example, a channel D under the control of the microcomputer 702. The main screen tuner 706 then converts the selected radio frequency video signal into an intermediate frequency signal. The main screen intermediate frequency detector 707 detects the intermediate frequency signal applied thereto, thereby outputting a main screen video signal and an automatic gain control voltage AGC2. The main screen video signal is applied to the video switching unit 708 whereas the automatic gain control voltage AGC2 is applied to the main screen tuner 706. The main screen video signal is then displayed on the main screen, as shown in FIG. 5, by the two-dimensional display unit 713 after passing through the video switching unit 708 and video switching and processing unit 712.

When quasi-moving video signals associated with channels other than the channel D, for example, channels A, B and C are generated under the condition that the moving video signal of the channel D is being displayed on the main screen as mentioned above, they are displayed on PIP/POP screens associated with those channels, respectively. This will now be described in detail.

The tuning memory 701 is previously stored with various broadcast channels, for example, channels ACH, BCH and CCH, and tuning frequencies TUNE_A, TUNE_B and TUNE_C respectively associated with those channels ACH, BCH and CCH. When the user sets a PIP/POP mode using the remote controller 700, automatic gain control data AGC_A, AGC_B and AGC_C are generated by the tuning accelerator 705 and then stored in the tuning memory 701. For the automatic gain control data, accordingly, an initialization is carried out (Step 10).

Figure 10:
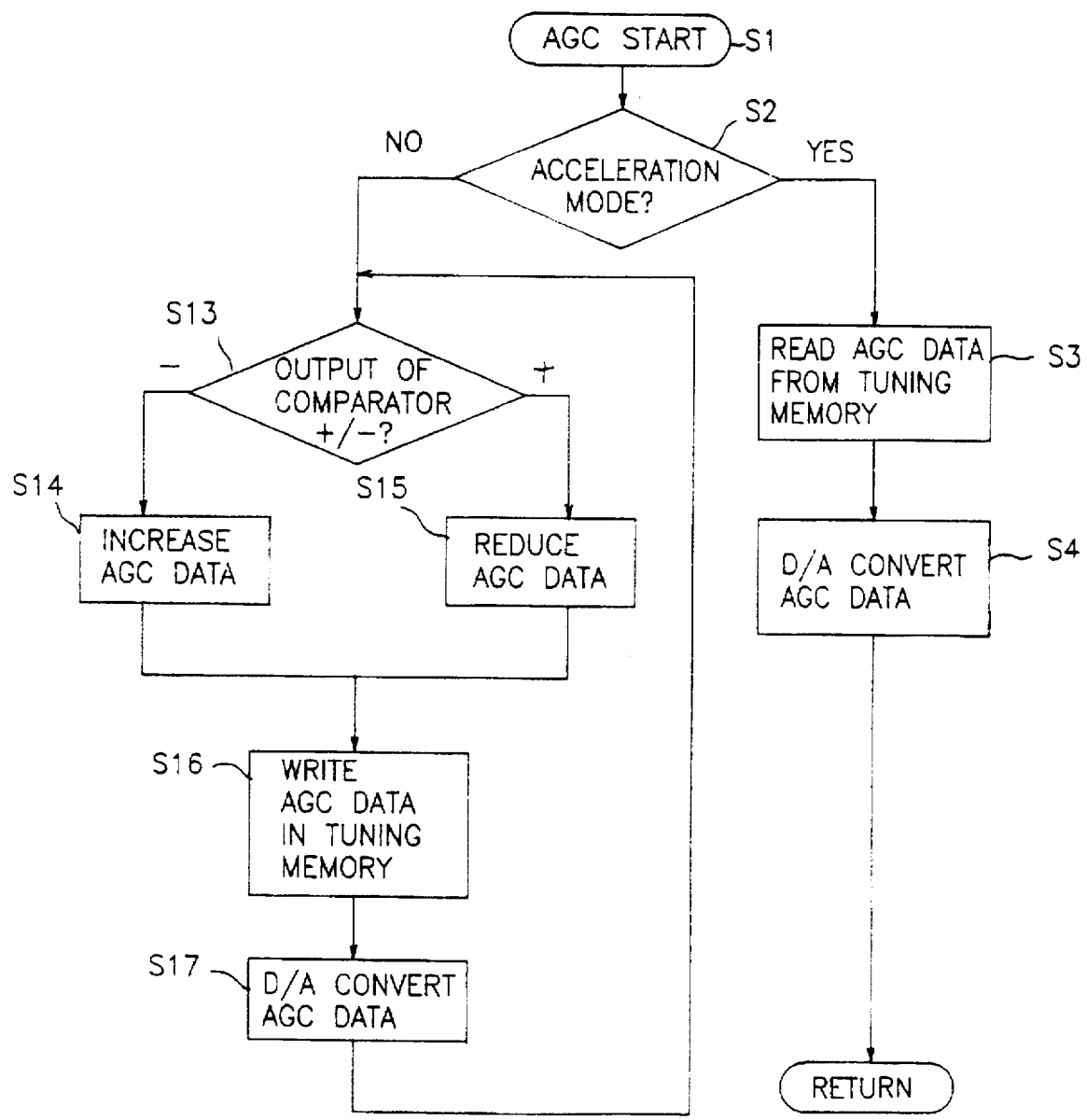
FIG. 10 is a flow chart illustrating an operation executed by a tuning accelerator included in the tuning unit of FIG. 7.

This initialization procedure will be described in more detail in conjunction with FIGS. 7 and 10. Once the microcomputer 702 starts its automatic gain control (Step S1), it determines whether or not the current operation mode corresponds to an acceleration mode (Step S2). Since the operation is being performed in the initialization mode, the microcomputer 702 applies one of the tuning frequencies previously stored in the tuning memory 701, which is associated with the target channel, to the sub-screen tuner 703. In accordance with the tuning frequency, the sub-screen intermediate frequency detector 704 then applies a corresponding sub-screen video signal to the video switching unit 708 while generating an automatic gain control voltage AGC1. Thereafter, the comparator 34 of the tuning accelerator 705 compares the automatic gain control voltage AGC1 received via the low-pass filter 33 with an automatic gain control voltage fed back from the digital/analog converter 36 (Step S13). The controller 35 then converts the fed-back automatic gain control voltage into digital automatic gain control data and varies the automatic gain control data in accordance with the result of the comparison. That is, the controller 35 increases the automatic control data when the output of the comparator 34 has a positive value (Step S14). When the output of the comparator 34 is a negative value, the controller 35 decreases the automatic control data (Step S15). The increased or decreased automatic gain control data is sent to the digital/analog converter 36 while being recorded in the tuning memory 701 (Step S16). The digital/analog converter 36 converts the received automatic gain control data into an analog automatic gain control voltage (Step S17). This analog automatic gain control voltage is applied to the subscreen tuner 703, comparator 34 and controller 35. The above procedure is repeated under the control of the microcomputer 702 until the automatic gain control data AGC_A, AGC_B and AGC_C for all channels are initialized.

Figure 9:
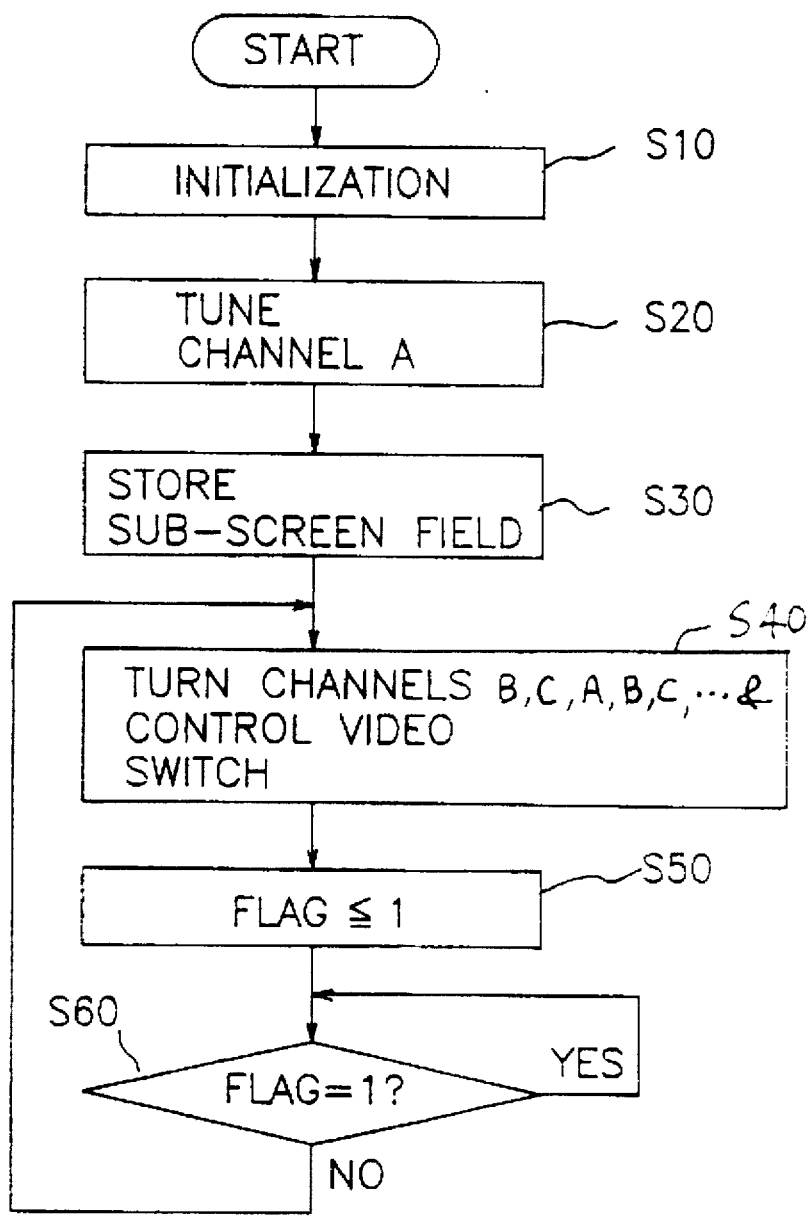
FIG. 9 is a flow chart illustrating a write operation executed by a video memory unit included in the apparatus of FIG. 6.

Once the initialization procedure is completed, the sub-screen tuner 703 performs the tuning operation for a radio frequency video signal associated with the channel A using the tuning frequency TUNE_A and automatic gain control data AGC_A both stored in the tuning memory 701 (Step 20), as shown in FIG. 9. This tuning operation is illustrated in FIG. 10. That is, once the microcomputer 702 starts its automatic gain control at step S1, the controller 35 of the tuning accelerator 705 reads the automatic gain control data AGC_A stored in the tuning memory 701 and then sends it to the digital/analog converter 36 (Step S3). The digital/ analog converter 36 converts the received automatic gain control data AGC_A into an analog automatic gain control voltage (Step S4). The converted automatic gain control voltage is then applied to the sub-screen tuner 703. Based on the automatic gain control voltage, the sub-screen tuner 703 selects the high frequency video signal of the channel A.

The sub-screen video signal output from the sub-screen intermediate frequency detector 704 is selected by the video switching unit 708 under the control of the quasi-moving moving multi-screen controller 806 included in the quasi-moving PIP/POP screen generating unit 710 so that it can be applied to the write processor 807. Thereafter, the write processor 807 reduces the input video signal, as shown in the flow chart of FIG. 9. One field or one frame of the reduced digital video data is stored in the buffer video memory 808 of the video memory unit 711 under the control of the quasi-moving multi-screen generation controller 806 (Step S30). In this case, a flag, which is used to control write and read operations of the video memory unit 711 in a handshake fashion, is set to "1" because when the vertical synchronous pulse signal Vpls1 for the main screen is time-divided for the channels, respectively, it has a high level within the time interval for the channel A, as shown in the leftmost portion of FIG. 11.

Figure 11:
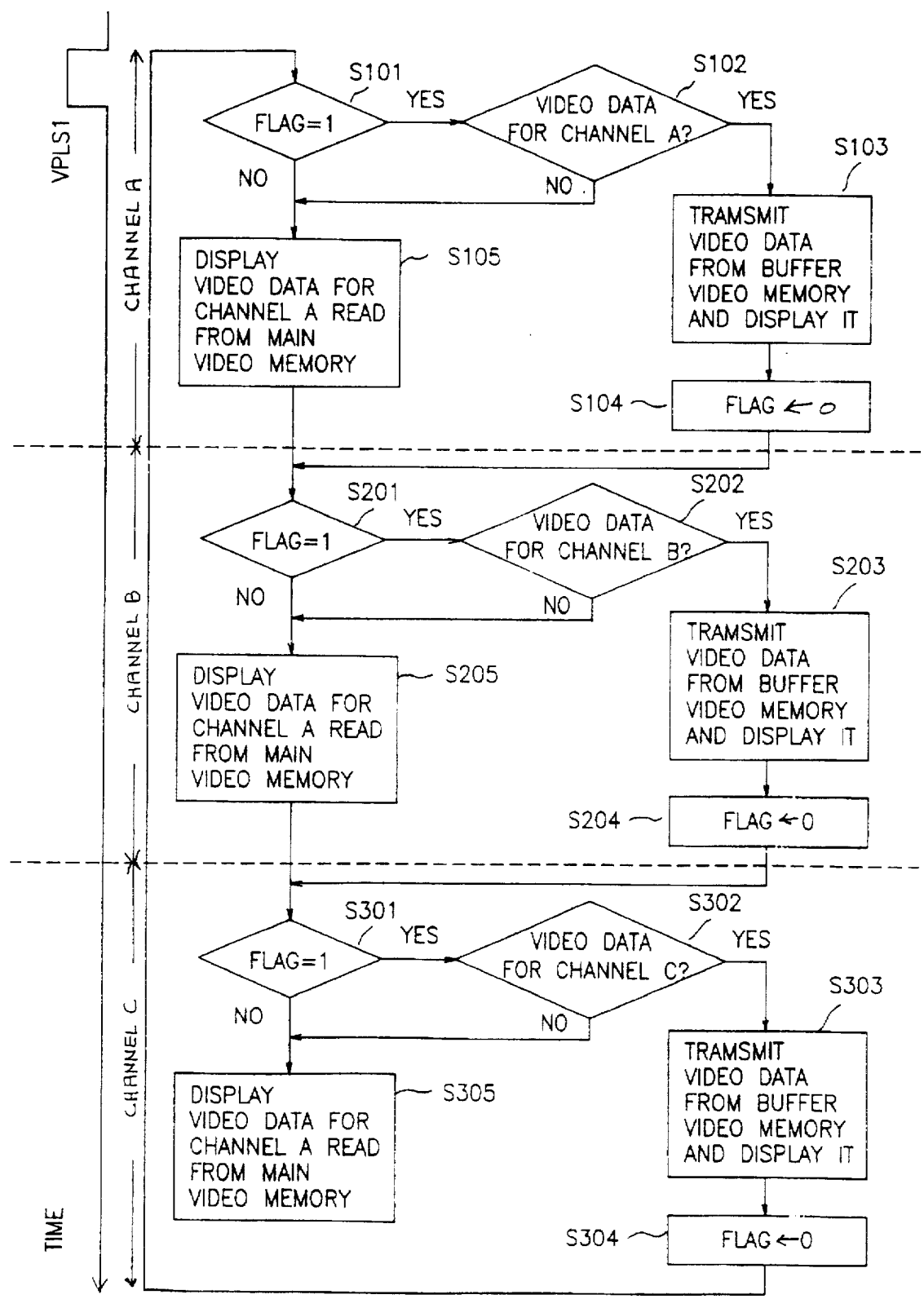
FIG. 11 is a flow chart illustrating a read operation executed by the video memory unit and an operation executed by a video processing and display unit included in the apparatus of FIG. 6.

Therefore, the quasi-moving multi-screen generation controller 806 determines whether or not the flag has been set to "1" (Step S101), as shown in FIG. 11. Since the flag has been set to "1", it is then determined whether or not the video data associated with the channel A has been stored in the buffer video memory 808 (Step S102). In this case, accordingly, the channel-A video data is output from the buffer video memory 808 and then transmitted to the main video memory 809. The transmitted video data is then stored in the channel-A memory location of the main video memory 809. As a result, data in the channel-A memory location is updated. In this case, the input selector 810 selects the video data output from the buffer video memory 808 under the control of the quasi-moving multi-screen generation controller 806. The selected video data is then displayed on the channel-A screen after passing through the video recovery processor 811 and video processing and display unit 75 (Step 103). If the flag is determined at step S101 as not being set to "1" or if it is determined at step S102 that the buffer video memory 808 has been stored with no video data associated with the channel A, then the input selector 810 selects the video data previously stored in the main video memory 809. The selected video data is then displayed on the channel-A screen after being processed in the same manner as in step S103 (Step S105).

Thereafter, the flag is reset to "0" (Step S104). The quasi-moving multi-screen generation controller 806 then applies in order to tune signal Tc to the microcomputer 702 in order to tune the radio frequency video signal associated with the channel B in the same manner as mentioned above. In order to select the video signal associated with the channel B, the quasi-moving multi-screen generation controller 806 controls the video switching unit 708 (Step S40). Since the main screen vertical synchronous pulse signal Vpls1, which is applied to the quasi-moving multi-screen generation controller 806, has a high level within the time interval for the channel B, the flag is set to "1" (Step S50), as shown in FIG. 9. This means that new video data has been stored in the buffer video memory 808. Accordingly, the quasi-moving multi-screen generation controller 806 performs a control for starting new write and display operations.

Accordingly, the quasi-moving multi-screen generation controller 806 determines whether or not the flag has been set to "1" (Step 60 in FIG. 9 and Step S201 in FIG. 11).

Since the flag has been set to "1", it is then determined whether or not the video data associated with the channel B has been stored in the buffer video memory 808 (Step S202). Since the channel-B video data has been stored in the buffer video memory 808, it is then transmitted to the main video memory 809 so that it can be stored in the channel-B memory location. This video data is then displayed on the channel-B screen after being processed in the same manner as in step S103 (Step 203). If the flag is determined at step S201 as not being set to "1" or if it is determined at step S202 that the buffer video memory 808 has been stored with no video data associated with the channel-B, then the input selector 810 selects the video data previously stored in the main video memory 809. The selected video data is then displayed on the channel-B screen after being processed in the same manner as in step S203 (Step S205).

Subsequently, the flag is reset to "0" (Step S204). The radio frequency video signal associated with the channel C is then tuned. Accordingly, steps S50, S60, S301, S302, S303, S304 and S305 similar to the above-mentioned steps are sequentially executed. Thus, the screens for the channels A, B and C become quasi-moving PIP/POP screens, respectively, as the radio frequency video signals of those channels are sequentially tuned.

Figure 5B:
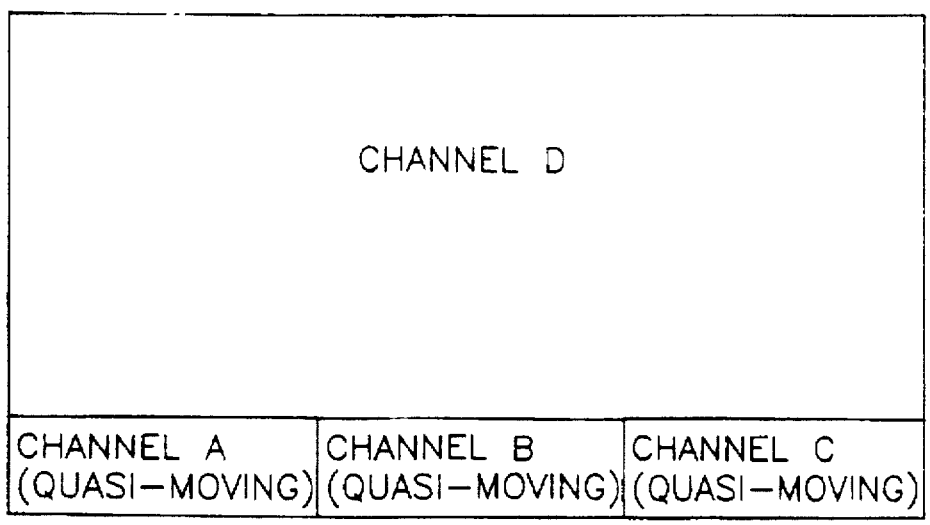

On the other hand, where the video switching unit 708 is controlled to select the externally input video signal AV, this external video signal can be displayed in the form of quasi-moving PIP/POP. When the horizontal synchronous pulse signal Hpls1 associated with the main screen is used, the quasi-moving PIP/POP screens are horizontally arranged, as shown in FIG. 5B.

Figure 12:
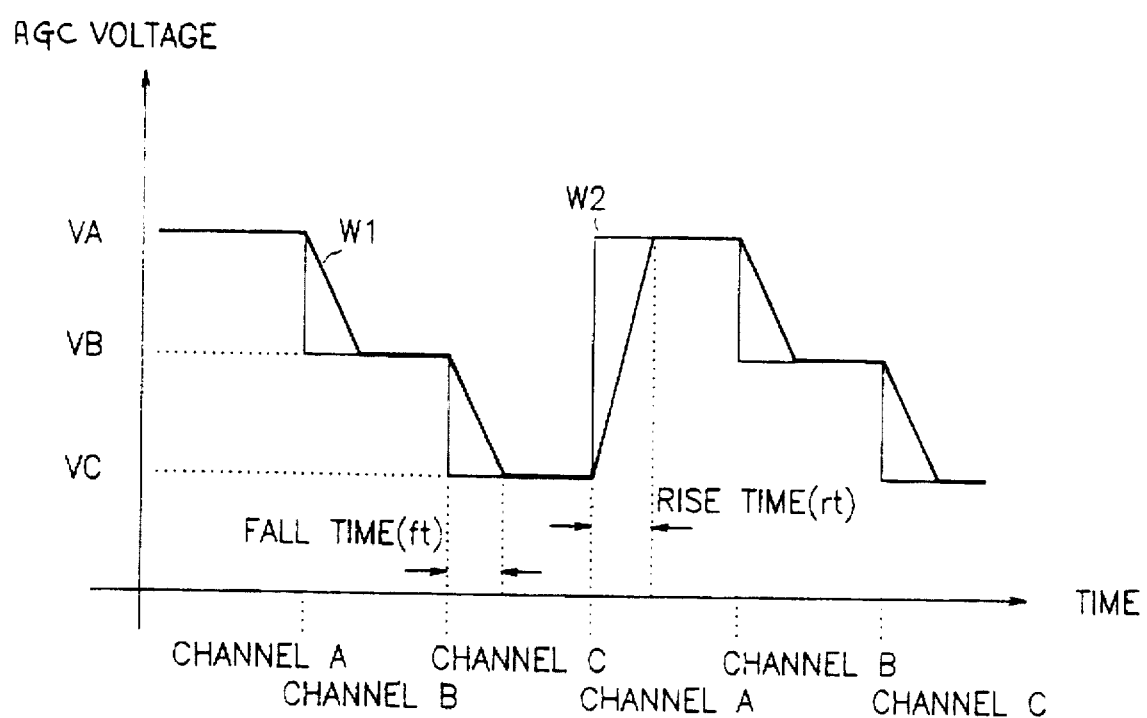
FIG. 12 is a waveform diagram illustrating automatic gain control voltages respectively output from the apparatus of FIG. 3 and the apparatus of FIG. 7.

As apparent from the above description, in accordance with the present invention, radio frequency video signals can be fast tuned because automatic gain control data associated with each channel is stored in the tuning memory upon the initialization thereof using the tuning accelerator. In other words, channels for sub-screens can be fast tuned because the automatic gain control voltage used in accordance with the present invention has a waveform approximate to the waveform W2 of an ideal automatic gain control voltage, as shown in FIG. 12. Accordingly, there is no screen flickering phenomenon upon the channel change. It is also possible to generate stable quasi-moving PIP/POP screens. In accordance with the present invention, it is also possible to generate a plurality of screens, in the form of fast quasi-moving PIP/POP, larger in number than the number of tuners used. Accordingly, video signals of various channels and externally input video signals can be displayed in a quasi-moving state on a plurality of PIP/POP screens.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating a plurality of quasi-moving picture-in-picture/picture-out-picture (PIP/POP) screens, comprising:

a tuning memory for storing tuning data used to tune radio frequency video signals of various channels;

a microcomputer for controlling a tuning operation for each of the radio frequency video signals in accordance with each associated channel search signal received through a remote controller;

a main screen tuning unit for tuning a radio frequency video signal of a channel associated with a main screen under a control of the microcomputer, thereby outputting a main screen video signals;

a sub-screen tuning unit for sequentially tuning radio frequency video signals of a plurality of channels respectively associated with sub-screens, thereby outputting sub-screen video signals;

a video switching and horizontal/vertical synchronous pulse signal generating unit for selecting either one of the video signals output from the sub-screen and main screen tuning units or an externally input video signal and detecting horizontal/vertical synchronous pulse signals for the main screen and sub-screen video signals;

a quasi-moving PIP/POP screen generating unit for controlling the video signal selection of the video switching and horizontal/vertical synchronous pulse signal generating unit, reducing the selected video signal, and outputting a quasi-moving PIP/POP video signal and a fast blanking signal;

a video memory unit for storing the reduced video signal output from the quasi-moving PIP/POP screen generating unit, the video memory unit including a buffer video memory and a main video memory;

a video processing and display unit for displaying the quasi-moving PIP/POP video signal output from the quasi-moving PIP/POP screen generating unit and the main screen video signal output from the video switching and horizontal/vertical synchronous pulse signal generating unit;

wherein the sub-screen tuning unit includes:
 a sub-screen tuner for receiving tuning data associated with each channel under control of the microcomputer and tuning the high frequency video signal of the channel based on the received tuning data;
 a sub-screen intermediate frequency detector for detecting an intermediate frequency signal output from the sub-screen tuner, thereby outputting a sub-screen video signal and an automatic gain control voltage; and
 a tuning accelerator for storing automatic gain control data, increased or decreased in accordance with both the automatic gain control voltage received thereto via a low-pass filter and a fed-back automatic gain control voltage, as tuning data to the tuning memory upon an initialization thereof.

2. The apparatus in accordance with claim 1, wherein the tuning accelerator comprises:
 a comparator for comparing the automatic gain control voltage received through the low-pass filter with the fed-back automatic gain control voltage;
 a controller for converting the fed-back automatic gain control voltage into digital automatic gain control data upon the initialization, increasing or decreasing the automatic gain control data in accordance with an output signal from the comparator, storing the increased or decreased automatic gain control data in the tuning memory, and outputting automatic gain control data previously stored in the tuning memory after the initialization is completed;
 a digital/analog converter for converting the automatic gain control data output from the controller into an analog automatic gain control voltage and applying the converted automatic gain control voltage to all the sub-screen tuner, the comparator and the controller.

3. An apparatus for generating a plurality of quasi-moving picture-in-picture/picture-out-picture (PIP/POP) screens, comprising:
 a tuning memory for storing tuning data used to tune radio frequency video signals of various channels;
 a microcomputer for controlling a tuning operation for each of the radio frequency video signals in accordance with each associated channel search signal received through a remote controller;
 a main screen tuning unit for tuning a radio frequency video signal of a channel associated with a main screen under a control of the microcomputer, thereby outputting a main screen video signals;
 a sub-screen tuning unit for sequentially tuning radio frequency video signals of a plurality of channels respectively associated with sub-screens, thereby outputting sub-screen video signals;
 a video switching and horizontal/vertical synchronous pulse signal generating unit for selecting either one of the video signals output from the sub-screen and main screen tuning units or an externally input video signal and detecting horizontal/vertical synchronous pulse signals for the main screen and sub-screen video signals;
 a quasi-moving PIP/POP screen generating unit for controlling the video signal selection of the video switching and horizontal/vertical synchronous pulse signal generating unit, reducing the selected video signal, and outputting a quasi-moving PIP/POP video signal and a fast blanking signal;
 a video memory unit for storing the reduced video signal output from the quasi-moving PIP/POP screen generating unit, the video memory unit including a buffer video memory and a main video memory;
 a video processing and display unit for displaying the quasi-moving PIP/POP video signal output from the quasi-moving PIP/POP screen generating unit and the main screen video signal output from the video switching and horizontal/vertical synchronous pulse signal generating unit;
 a quasi-moving multi-screen generation controller for controlling write and read operations of the video memory unit by use of a flag set or reset in accordance with the main screen horizontal/vertical synchronous pulse signals received thereto, and outputting a tuning control signal for a channel change;
 a write processor for reducing the sub-screen video signal received thereto under a control of the quasi-moving multi-screen generation controller;
 an input selector for selecting video data output from the buffer video memory or the main video memory under a control of the quasi-moving multi-screen generation controller; and
 a video recovery processor for recovering the video data output from the input selector as a sub-screen video signal under a control of the quasi-moving multi-screen generation controller thereby outputting the quasi-moving PIP/POP video signal and the fast blanking signal.

4. An apparatus for generating a plurality of quasi-moving picture-in-picture/picture-out-picture (PIP/POP) screens, comprising:
 a microcomputer for generating at least one of a first tuning control signal and a second tuning control signal in response to an instruction from a user;
 a first screen tuning unit for providing a first screen video signal in response to said first tuning control signal from the microcomputer; and
 a second screen tuning unit for providing at least one second screen video signal in response to said second tuning control signal of the microcomputer,
 wherein said second screen tuning unit includes a tuner for tuning said at least one second screen video signal at a corresponding channel frequency in response to a first channel control signal;

a detector coupled to said tuner of the second screen tuning unit for providing a second channel control signal at least partially representing said second screen video signal; and a tuning accelerator coupled to said detector for controlling the magnitude of said second channel control signal based on said first and second channel control signal to provide said first channel control signal.

5. The apparatus in accordance with claim 4, wherein said tuning accelerator includes a means for either increasing or decreasing the magnitude of said second channel control signal to provide said first channel control signal to said tuner.

6. The apparatus in accordance with claim 4, wherein said tuning accelerator further includes a low pass filter for filtering said second channel control signal.

* * * * *